(12) United States Patent
Ban et al.

(10) Patent No.: US 11,515,690 B2
(45) Date of Patent: Nov. 29, 2022

(54) SPARK PLUG

(71) Applicant: NGK SPARK PLUG CO., LTD., Nagoya (JP)

(72) Inventors: Kenji Ban, Nagoya (JP); Tatsuya Gozawa, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 0 days.

(21) Appl. No.: 17/292,898

(22) PCT Filed: Apr. 27, 2020

(86) PCT No.: PCT/JP2020/017968
§ 371 (c)(1),
(2) Date: May 11, 2021

(87) PCT Pub. No.: WO2021/044668
PCT Pub. Date: Mar. 11, 2021

(65) Prior Publication Data
US 2021/0399532 A1 Dec. 23, 2021

(30) Foreign Application Priority Data
Sep. 5, 2019 (JP) .............................. JP2019-161692

(51) Int. Cl.
*H01T 13/54* (2006.01)
*H01T 13/32* (2006.01)

(52) U.S. Cl.
CPC ............. *H01T 13/54* (2013.01); *H01T 13/32* (2013.01)

(58) Field of Classification Search
CPC .............................. H01T 13/54; H01T 13/06
See application file for complete search history.

(56) References Cited

U.S. PATENT DOCUMENTS

2011/0254429 A1   10/2011  Kameda et al.
2012/0240890 A1*   9/2012  Johng ................ F02P 13/00
                                                   123/169 P
(Continued)

FOREIGN PATENT DOCUMENTS

CN      105633800 A    6/2016
JP      55-51827 U1    4/1980
(Continued)

OTHER PUBLICATIONS

International Search Report from corresponding International Patent Application No. PCT/JP20/17968, dated Jul. 14, 2020.
(Continued)

*Primary Examiner* — Andrew J Coughlin
(74) *Attorney, Agent, or Firm* — Kusner & Jaffe (57) ABSTRACT

A spark plug capable of generating a sufficient volume of jet with an increased range is provided. The spark plug includes a metal shell having a tubular shape; a center electrode retained in the metal shell in an insulated manner; a ground electrode that is electrically connected to the metal shell and that defines a spark gap between the center electrode and an end portion of the ground electrode; and a cap portion that covers the center electrode and the end portion of the ground electrode from the front in a region in front of the metal shell and in which a through hole is formed. The cap portion includes a plurality of projections on an inner surface of the through hole. The projections extend in an extending direction in which the through hole extends.

6 Claims, 6 Drawing Sheets

(56) References Cited

U.S. PATENT DOCUMENTS

| | | | |
|---|---|---|---|
| 2012/0242215 A1* | 9/2012 | Hwang | H01T 13/54 313/143 |
| 2012/0299459 A1* | 11/2012 | Sakakura | H01T 13/54 445/3 |
| 2016/0237971 A1* | 8/2016 | Rowan | F02M 61/1806 |
| 2018/0030943 A1* | 2/2018 | Kato | F02M 61/1833 |

FOREIGN PATENT DOCUMENTS

| | | |
|---|---|---|
| JP | 2010-96089 A | 4/2010 |
| JP | 2010-153330 A | 7/2010 |
| JP | 2017-103179 A | 6/2017 |

OTHER PUBLICATIONS

Office Action (with English language machine translation) dated Sep. 2, 2021 from corresponding Chinese Patent Appl. No. 202080005814.8.

* cited by examiner

SPARK PLUG

FIELD OF THE INVENTION

The present invention relates to a spark plug including a pre-chamber for a combustion chamber of an engine.

BACKGROUND OF THE INVENTION

A spark plug including a pre-chamber for a combustion chamber of an engine is known from Japanese Unexamined Patent Application Publication No. 2017-103179 (hereinafter "PTL 1"). According to the technology disclosed in PTL 1, a cap portion connected to a metal shell defines the pre-chamber in the combustion chamber. Combustible air-fuel mixture flows into the pre-chamber from the combustion chamber through a through hole formed in the cap portion. The spark plug ignites the combustible air-fuel mixture that has reached a spark gap, so that the combustible air-fuel mixture is combusted to generate an expansion pressure that causes a gas flow including flame to be injected into the combustion chamber through the through hole in the cap portion. The combustible air-fuel mixture in the combustion chamber is combusted by the injected jet of flame.

Technical Problem

In this type of spark plug, as the size of the through hole in the cap portion increases, the pressure in the pre-chamber at the time of ignition decreases. Accordingly, the velocity of the jet from the pre-chamber toward the combustion chamber decreases, which leads to a reduction in the range of the jet. As a result, the volume of the combustible air-fuel mixture ignited by the jet decreases. In contrast, as the size of the through hole decreases, the pressure in the pre-chamber at the time of ignition increases. Accordingly, the velocity of the jet increases, which leads to an increase in the range of the jet. However, since the volume of the jet decreases as the size of the through hole decreases, there is a problem that the volume of the combustible air-fuel mixture ignited by the jet decreases. A failure of high-speed combustion may occur both when the jet has a small range and when the volume of the jet is small.

SUMMARY OF THE INVENTION

The present invention has been made to solve the above-described problem, and an object of the present invention is to provide a spark plug capable of generating a sufficient volume of jet with an increased range.

Solution to Problem

To achieve the above-described object, a spark plug according to the present invention includes a metal shell having a tubular shape and extending in a direction from front to back; a center electrode retained in the metal shell in an insulated manner; a ground electrode that is electrically connected to the metal shell and that defines a spark gap between the center electrode and an end portion of the ground electrode; and a cap portion that covers the center electrode and the end portion of the ground electrode from the front in a region in front of the metal shell and in which a through hole is formed. The cap portion includes a plurality of projections on an inner surface of the through hole. The projections extend in an extending direction in which the through hole extends.

Advantageous Effects of Invention

According to a first aspect of the spark plug, the through hole is formed in the cap portion, which covers the center electrode and the end portion of the ground electrode from the front in a region in front of the tubular metal shell. The cap portion includes the plurality of projections on the inner surface of the through hole, and the projections extend in the extending direction in which the through hole extends. The projections serve to reduce the drag created when a gas flow passes through the through hole. Therefore, a jet with an increased velocity can be generated without reducing the size of the through hole. Accordingly, the range of the jet can be increased, so that a sufficient volume of jet with an increased range can be generated.

According to a second aspect of the spark plug, each projection has a width that decreases toward an apex of the projection in a cross section perpendicular to the extending direction. In this case, the drag created when the gas flow passes through the through hole can be further reduced. Accordingly, not only can the effects of the first aspect be obtained, but also the range of the jet can be further increased.

According to a third aspect of the spark plug, an apex of each projection is a flat surface. In this case, the occurrence of overheating of the apex is less than when the apex of each projection is an edge between two surfaces. Accordingly, not only can the effects of the first and second aspects be obtained, but also the occurrence of pre-ignition with the apex serving as a source can be reduced.

According to a fourth aspect of the spark plug, an apex of each projection is a portion of a curved surface. In this case, the occurrence of overheating of the apex is less than when the apex of each projection is an edge between two surfaces. Accordingly, not only can the effects of the first and second aspects be obtained, but also the occurrence of pre-ignition with the apex serving as a source can be reduced.

According to a fifth aspect of the spark plug, each projection includes a top surface that constitutes the apex and a side surface connected to the top surface, and a corner at which the top surface is connected to the side surface is rounded. In this case, the occurrence of overheating of the corner is less than when the corner at which the top surface is connected to the side surface is a non-rounded corner (edge). Accordingly, not only can the effects of the third aspect be obtained, but also the occurrence of pre-ignition with the corner serving as a source can be reduced.

According to a sixth aspect of the spark plug, a distance between two of the projections that are adjacent to each other is less than a width of each of the two of the projections in a cross section perpendicular to the extending direction. In this case, the drag created when portions of the gas flow enter the spaces between the projections can be reduced. Accordingly, not only can the effects of any one of the aspects 1 through 5 be obtained, the range of the jet can be further increased.

BRIEF DESCRIPTION OF DRAWINGS

FIG. 4 (a) is a front view of a through hole in a spark plug according to a second embodiment; FIG. 4 (b) is a front view of a through hole in a spark plug according to a third embodiment; and FIG. 4 (c) is a front view of a through hole in a spark plug according to a fourth embodiment.

FIG. 5 (a) is a front view of a through hole in a spark plug according to a fifth embodiment; FIG. 5 (b) is a front view of a through hole in a spark plug according to a sixth embodiment; and (c) is a front view of a through hole in a spark plug according to a seventh embodiment.

FIG. 6 (a) is a front view of a through hole in a spark plug according to an eighth embodiment; FIG. 6 (b) is a front view of a through hole in a spark plug according to a ninth embodiment; and FIG. 6 (c) is a front view of a through hole in a spark plug according to a tenth embodiment.

DETAILED DESCRIPTION OF THE INVENTION

Figure 1:
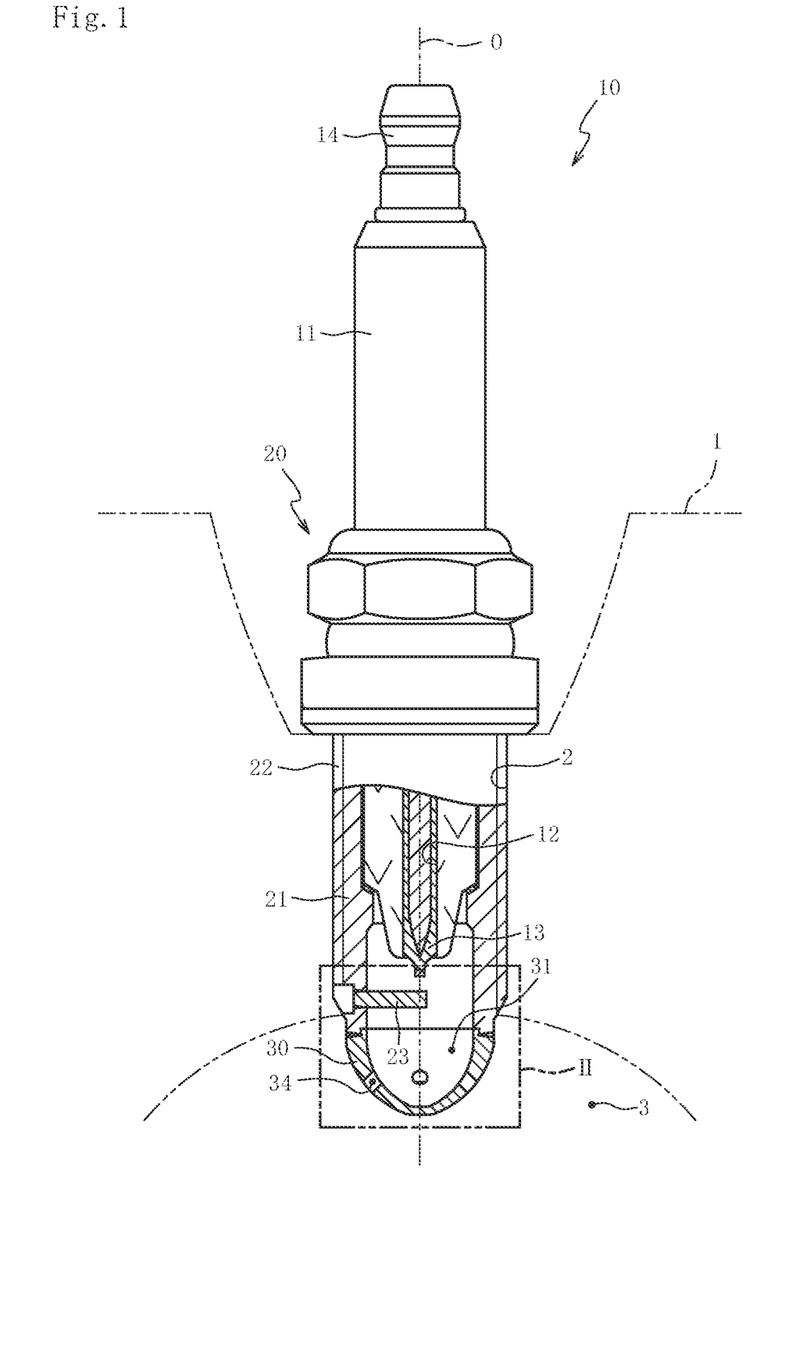
FIG. 1 is a partially sectioned view of a spark plug according to a first embodiment.

Preferred embodiments of the present invention will now be described with reference to the accompanying drawings. FIG. 1 is a partially sectioned view of a spark plug 10 according to a first embodiment. The bottom of FIG. 1 is defined as the front of the spark plug 10, and the top of FIG. 1 is defined as the back of the spark plug 10 (this also applies to FIG. 2). FIG. 1 shows a cross section of a front portion of the spark plug 10 including an axial line O. As illustrated in FIG. 1, the spark plug 10 includes an insulator 11, a center electrode 13, a metal shell 20, a ground electrode 23, and a cap portion 30.

The insulator 11 is a substantially cylindrical member having an axial hole 12 that extends along the axial line O, and is made of a ceramic, such as alumina, having good mechanical characteristics and high insulation properties at high temperatures. The center electrode 13 is disposed in a front region of the axial hole 12 in the insulator 11. The center electrode 13 is electrically connected to a metal terminal 14 in the axial hole 12. The metal terminal 14 is a rod-shaped member to which a high-voltage cable (not shown) is connected, and is made of a conductive metal material (for example, low-carbon steel). The metal terminal 14 is fixed to the back end of the insulator 11.

The metal shell 20 is a substantially cylindrical member made of a conductive metal material (for example, low-carbon steel). The metal shell 20 includes a front end portion 21 having an external thread 22 formed on an outer peripheral surface thereof. The spark plug 10 is attached to an engine 1 by screwing the external thread 22 of the metal shell 20 into a threaded hole 2 in the engine 1.

The ground electrode 23 is a rod-shaped member made of a metal material containing, for example, Pt as a main component. In the present embodiment, the ground electrode 23 is connected to the metal shell 20 at a position where the external thread 22 is provided, and extends through the front end portion 21 to project into the inside of the front end portion 21. The main component of the material of the ground electrode 23 is not limited to the above-described element, and may, of course, instead be other elements. Examples of other elements include Ni and Ir.

The cap portion 30 is connected to the front end portion 21 of the metal shell 20 in a region in front of the external thread 22. A pre-chamber 31 is defined as a space surrounded by the metal shell 20 and the cap portion 30. When the spark plug 10 is attached to the engine 1, the cap portion 30 is exposed in the combustion chamber 3 of the engine 1.

The cap portion 30 is made of a metal material containing, for example, Fe as a main component. The main component of the material of the cap portion 30 is not limited to this element, and may, of course, instead be other elements. Examples of other elements include Ni and Cu.

Figure 2:
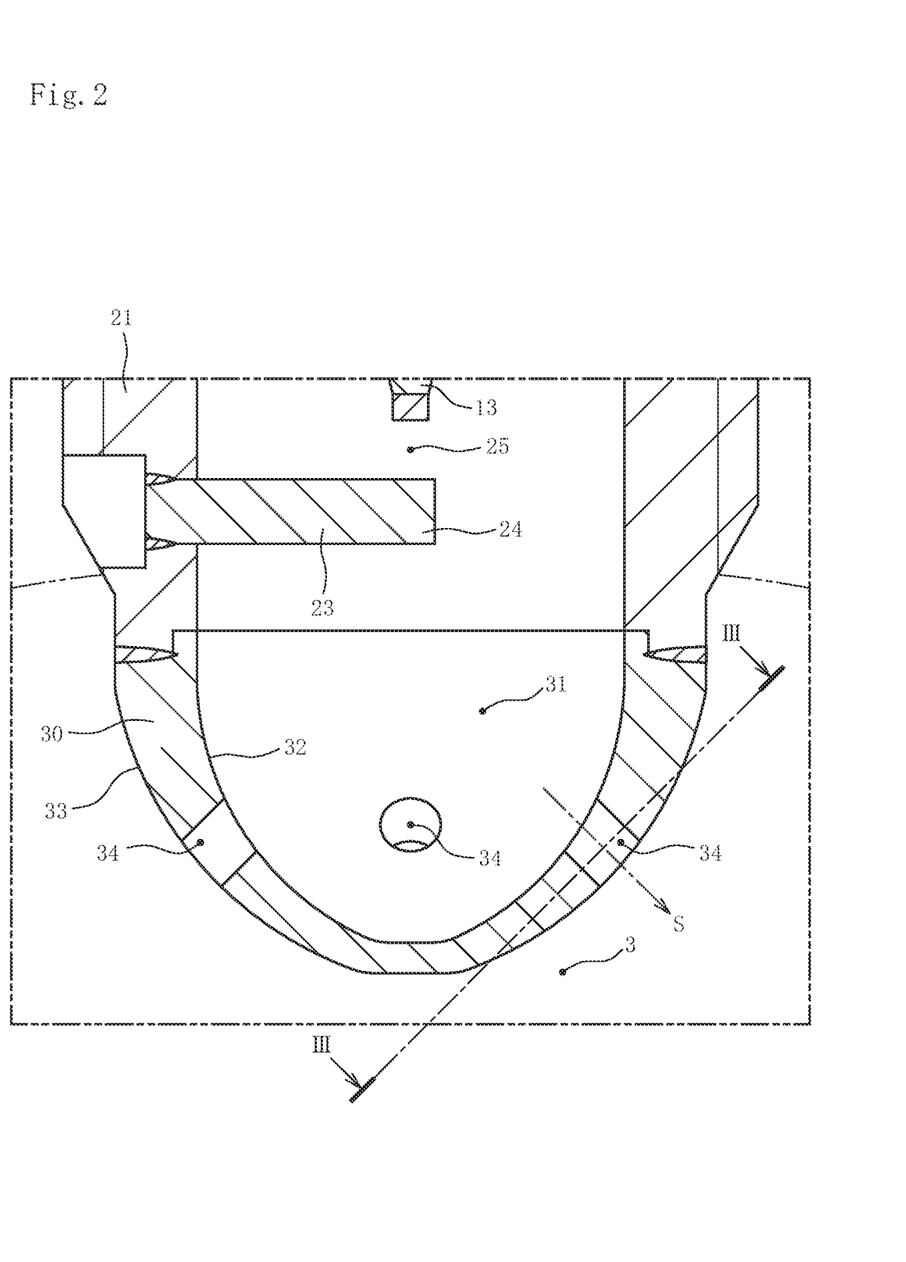
FIG. 2 is an enlarged partial sectional view of the spark plug illustrating part II in FIG. 1.

FIG. 2 is an enlarged partial sectional view of the spark plug 10 including the axial line O, illustrating part II in FIG. 1. The ground electrode 23 includes an end portion 24 that projects into the inside of the front end portion 21 of the metal shell 20 and that faces the center electrode 13. A spark gap 25 is formed between the end portion 24 of the ground electrode 23 and the center electrode 13. Since the ground electrode 23 is joined to the metal shell 20 at a position where the external thread 22 (see FIG. 1) is provided, heat of the ground electrode 23 is transferred to the engine 1 through the external thread 22.

The cap portion 30 covers the center electrode 13 and the end portion 24 of the ground electrode 23 from the front. In the present embodiment, the cap portion 30 is welded to the metal shell 20. An inner surface 32 of the cap portion 30 is in contact with the pre-chamber 31, and an outer surface 33 of the cap portion 30 is in contact with the combustion chamber 3. The cap portion 30 has through holes 34 in a region in front of the ground electrode 23. The through holes 34 connect the pre-chamber 31 and the combustion chamber 3 to each other. In the present embodiment, a plurality of the through holes 34 are formed in the cap portion 30. In FIG. 2, the arrow S shows an extending direction in which the corresponding through hole 34 extends.

Figure 3:
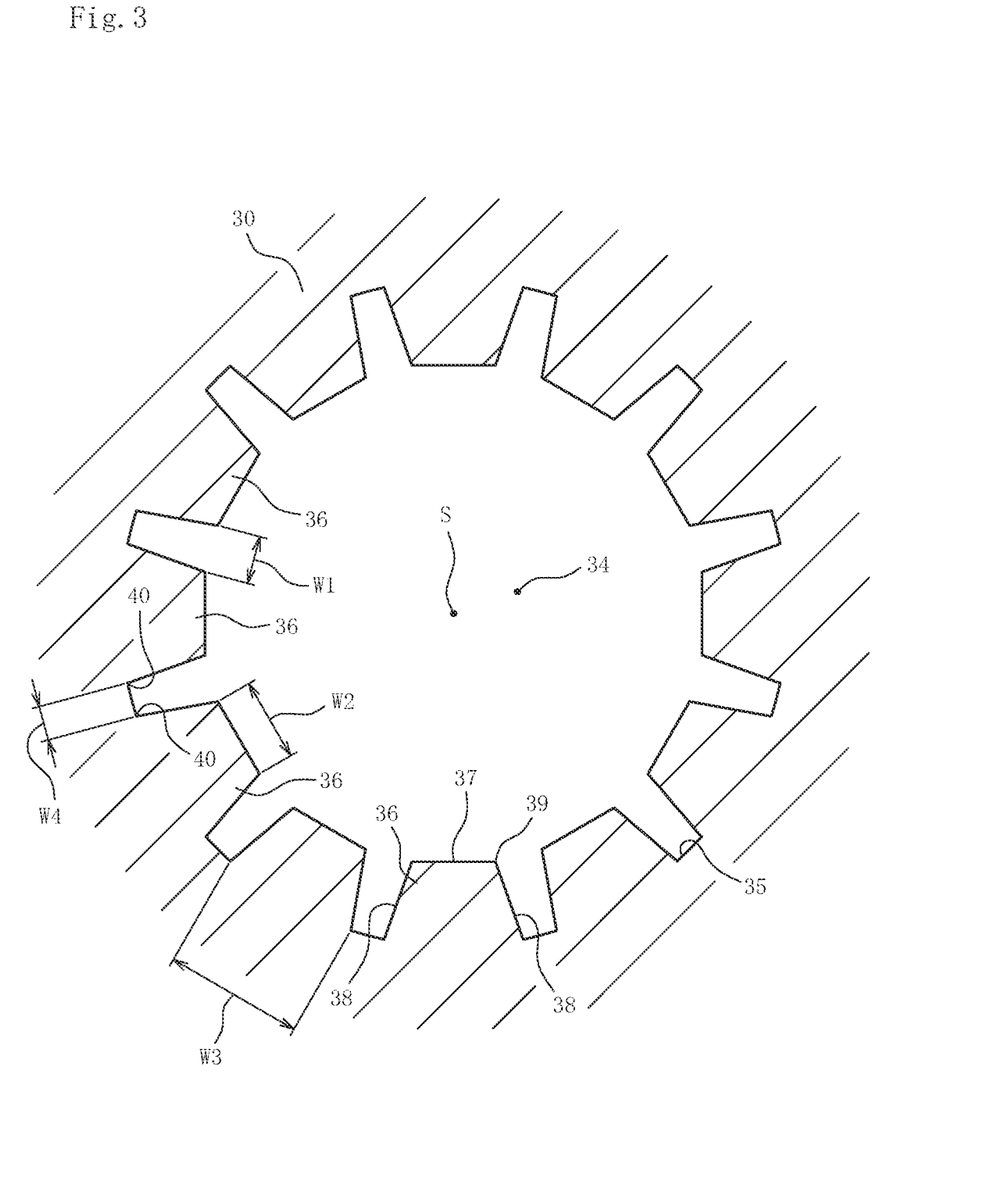
FIG. 3 is a sectional view of a cap portion taken along line III-III in FIG. 2.

FIG. 3 is a sectional view of the cap portion 30 taken along line in FIG. 2, that is, along a plane perpendicular to the extending direction S of the through hole 34. As illustrated in FIG. 3, the through hole 34 formed in the cap portion 30 has an inner surface 35 having a circular cross-sectional shape. A plurality of projections 36 are provided on the inner surface 35 of the through hole 34. In the present embodiment, all of the projections 36 have the same shape and the same size. For example, four to twenty projections 36 are provided on the inner surface 35 of each through hole 34.

Each of the projections 36 extends in the extending direction of the through hole 34 (direction perpendicular to the plane of FIG. 3). This means that the length of each projection 36 in the extending direction S (see FIG. 2) is greater than the width of the projection 36 in a circumferential direction of the inner surface 35. In the present embodiment, each projection 36 has the same cross-sectional shape over the entire length thereof in the extending direction S of the through hole 34 from the inner surface 32 (see FIG. 2) to the outer surface 33 of the cap portion 30.

The projections 36 have a trapezoidal cross-sectional shape along a plane perpendicular to the extending direction S. Each projection 36 includes a top surface 37 that defines the apex of the projection 36 and side surfaces 38 connected to the top surface 37. The top surface 37 and the side surfaces 38 are flat surfaces that extend in the extending direction S of the through hole 34. Corners (edges) 39 at which the top surface 37 is connected to the side surfaces 38 and corners 40 at which the side surfaces 38 are connected to the inner surface 35 extend in the extending direction S.

Focusing on one of the projections 36, a distance W2 between one corner 39 and the other corner 39 of the projection 36 (width of the top surface 37) is less than a distance W3 between one corner 40 and the other corner 40 of the projection 36 (length of the lower base of the projection 36). In other words, in a cross section perpendicular to the extending direction S of the through hole 34, the width of the projection 36 decreases toward the top surface 37 of the projection 36.

Focusing on two of the projections 36 that are adjacent to each other, a distance W1 between the corners 39 of the two projections 36 is less than the widths W2 and W3 of each of the projections 36. A distance W4 between the corners 40 of the two projections 36 is also less than the widths W2 and W3 of each of the projections 36. The inner surface 35 and the projections 36 of the through hole 34 are formed on the cap portion 30 by, for example, electric discharge machining or etching.

In response to a valve operation of the engine 1 (see FIG. 1), combustible air-fuel mixture flows into the pre-chamber 31 inside the cap portion 30 of the spark plug 10, which is attached to the engine 1, from the combustion chamber 3 through the through holes 34. The spark plug 10 causes a discharge between the center electrode 13 and the ground electrode 23 to create a flame kernel in the spark gap 25. When the flame kernel grows, the combustible air-fuel mixture in the pre-chamber 31 is ignited and combusted. The combustion generates an expansion pressure so that the spark plug 10 injects a gas flow including flame into the combustion chamber 3 through each through hole 34. The combustible air-fuel mixture in the combustion chamber 3 is combusted by the injected jet of flame.

The gas flow that flows into the combustion chamber 3 from the pre-chamber 31 through each through hole 34 during the ignition has a boundary layer, in which the velocity is low, on the inner surface 35 of the through hole 34 due to the viscosity of the gas flow. The boundary layer has a velocity gradient that creates a friction drag on the inner surface 35. Also, a pressure drag is created when the gas flow is separated from the inner surface 35 of the through hole 34. These drags cause a reduction in the velocity of the jet.

However, since the inner surface 35 of each through hole 34 in the cap portion 30 is provided with the projections 36 that extend in the extending direction S of the through hole 34, the boundary layer on the inner surface 35 changes from a laminar flow to a turbulent flow due to the projections 36. Accordingly, the drag created when the gas flow passes through the through hole 34 can be reduced. As a result, the velocity of the gas flow that passes through the through hole 34 toward the combustion chamber 3 can be increased. Since it is not necessary to increase the velocity of the jet by reducing the size of the through hole 34 to increase the pressure in the pre-chamber 31, the size of the through hole 34 can be somewhat increased to generate a sufficient volume of jet. Therefore, a sufficient volume of jet of flame with an increased range can be generated. Accordingly, a high-speed combustion in which all of the combustible air-fuel mixture in the combustion chamber 3 is quickly combusted can be realized.

In a cross section perpendicular to the extending direction S, the width of each projection 36 decreases toward the top surface 37 of the projection 36 (W2<W3). According to these projections 36, compared to when W2=W3, the drag created when the gas flow passes through the through hole 34 can be further reduced. Therefore, the range of the jet can be further increased.

Since the top surface 37 of each projection 36 is a flat surface, the occurrence of overheating of the top surface 37 is less than when the apex of each projection 36 is an edge between two surfaces. Therefore, the occurrence of pre-ignition with the top surface 37 serving as a source can be reduced.

In a cross section perpendicular to the extending direction S, each projection 36 has a trapezoidal shape that satisfies W2<W3. Therefore, the angles between the top surface 37 and the side surfaces 38 at the corners 39 are obtuse. Accordingly, the occurrence of pre-ignition with the corners 39 serving as a source is less than when the angles between the top surface 37 and the side surfaces 38 are acute.

In a cross section perpendicular to the extending direction S, the distances W1 and W4 between two of the projections 36 that are adjacent to each other are less than the widths W2 and W3 of each of the two projections 36. Accordingly, the drag created when portions of the gas flow enter the spaces between the projections 36 can be reduced. Therefore, the range of the jet can be further increased.

Figure 4:
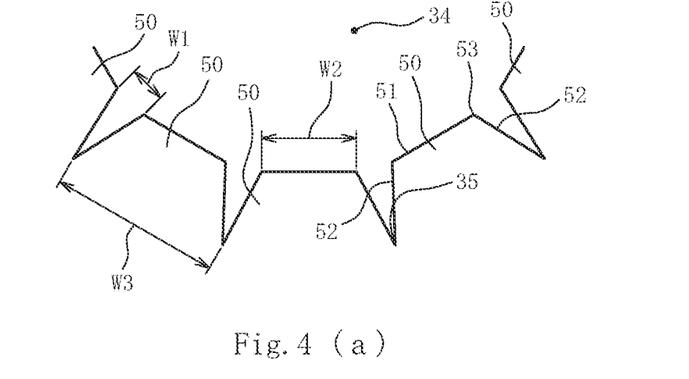

A second embodiment will now be described with reference to FIG. 4(a). FIG. 4(a) is a front view of a through hole 34 in a spark plug according to the second embodiment (through hole 34 as viewed in the extending direction S of the through hole 34). FIG. 4(a) shows a portion of the circumference an inner surface 35 of the through hole 34. The inner surface 35 of the through hole 34 has projections 50 instead of the projections 36 of the spark plug 10 described in the first embodiment. Thus, portions that are the same as those described in the first embodiment are denoted by the same reference signs, and description thereof will be omitted. The illustrations in the drawing and omission of description also apply to other embodiments described below with reference to FIG. 4(b) and the following figures.

The projections 50 extend in the extending direction of the through hole 34 (direction perpendicular to the plane of FIG. 4(a)). Therefore, the drag on the inner surface 35 of the through hole 34 can be reduced by the projections 50. The projections 50 continuously extend over the entire length of the through hole 34 in the extending direction S from the inner surface 32 to the outer surface 33 of the cap portion 30 (see FIG. 2).

The projections 50 have a trapezoidal cross-sectional shape along a plane perpendicular to the extending direction S. Each projection 50 includes a top surface 51 that defines the apex of the projection 50 and side surfaces 52 connected to the top surface 51. The top surface 51 and the side surfaces 52 are flat surfaces that extend in the extending direction S of the through hole 34. Corners (edges) 53 at which the top surface 51 is connected to the side surfaces 52 extend in the extending direction S. Since the top surface 51 of each projection 50 is a flat surface, the occurrence of overheating of the top surface 51 is less than when the apex of the projection 50 is an edge between two surfaces. Therefore, the occurrence of pre-ignition with the top surface 51 serving as a source can be reduced.

Focusing on one of the projections 50, a distance W2 between one corner 53 and the other corner 53 of the projection 50 (width of the top surface 51) is less than a length W3 of the lower base of the projection 50. In other words, in a cross section perpendicular to the extending direction S of the through hole 34, the width of the projection 50 decreases toward the top surface 51 of the projection 50. Accordingly, the drag created when the gas flow passes through the through hole 34 can be further reduced.

Focusing on two of the projections 50 that are adjacent to each other, a distance W1 between the corners 53 of the two projections 50 is less than the widths W2 and W3 of each of the projections 50. Accordingly, the drag created when portions of the gas flow enter the spaces between the adjacent projections 50 can be reduced.

The projections 50 are arranged such that the adjacent projections 50 are in contact with each other on the inner surface 35. Since the gaps between the adjacent projections 50 can be reduced, the drag created when portions of the gas flow enter the spaces between the adjacent projections 50 can be further reduced.

A third embodiment will now be described with reference to FIG. 4(b). FIG. 4(b) is a front view of the through hole 34 in a spark plug according to the third embodiment. Projections 60 extend in the extending direction of the through hole 34 (direction perpendicular to the plane of FIG. 4(b)). Therefore, the drag on the inner surface 35 of the through hole 34 can be reduced by the projections 60. The projections 60 continuously extend over the entire length of the through hole 34 in the extending direction S from the inner surface 32 to the outer surface 33 of the cap portion 30 (see FIG. 2).

Each projection 60 includes a top surface 61 that defines the apex of the projection 60 and side surfaces 62 connected to the top surface 61. Corners at which the top surface 61 is connected to the side surfaces 62 are rounded corners 63. The top surface 61 and the side surfaces 62 are flat surfaces that extend in the extending direction S of the through hole 34. Corners 64 at which the side surfaces 62 are connected to the inner surface 35 extend in the extending direction S.

Focusing on one of the projections 60, a width W2 of the top surface 61 of the projection 60 is less than a distance W3 between one corner 64 and the other corner 64 of the projection 60 (length of the lower base of the projection 60). In other words, in a cross section perpendicular to the extending direction S of the through hole 34, the width of the projection 60 decreases toward the top surface 61 of the projection 60. Accordingly, the drag created when the gas flow passes through the through hole 34 can be further reduced.

In a cross section perpendicular to the extending direction S, each projection 60 satisfies W2<W3. Therefore, the angles between the top surface 61 and the side surfaces 62 at the rounded corners 63 are obtuse. Accordingly, the occurrence of pre-ignition with the rounded corners 63 serving as a source is less than when the angles between the top surface 61 and the side surfaces 62 are acute.

Since the corners at which the top surface 61 is connected to the side surfaces 62 are the rounded corners 63, the occurrence of overheating of the corners is less than when the corners at which the top surface 61 is connected to the side surfaces 62 are non-rounded corners (edges). Therefore, the occurrence of pre-ignition with the corners serving as a source can be reduced.

Focusing on two of the projections 60 that are adjacent to each other, a distance W1 between the ends of the top surfaces 61 of the two projections 60 is less than the width W3 of each of the projections 60. A distance W4 between the corners 64 of the two projections 60 is less than the widths W2 and W3 of each of the projections 60, and W1 is greater than W4. Accordingly, the drag created when portions of the gas flow enter the spaces between the adjacent projections 60 can be reduced.

A fourth embodiment will now be described with reference to FIG. 4(c). FIG. 4(c) is a front view of the through hole 34 in a spark plug according to the fourth embodiment. Projections 70 extend in the extending direction of the through hole 34 (direction perpendicular to the plane of FIG. 4(c)). Therefore, the drag on the inner surface 35 of the through hole 34 can be reduced by the projections 70. The projections 70 continuously extend over the entire length of the through hole 34 in the extending direction S from the inner surface 32 to the outer surface 33 of the cap portion 30 (see FIG. 2).

Each projection 70 includes a top surface 71 that defines the apex of the projection 70 and side surfaces 72 connected to the top surface 71. Corners at which the top surface 71 is connected to the side surfaces 72 are rounded corners 73. The top surface 71 and the side surfaces 72 are flat surfaces that extend in the extending direction S of the through hole 34.

Focusing on one of the projections 70, a width W2 of the top surface 71 of the projection 70 is less than a length W3 of the lower base of the projection 70. In other words, in a cross section perpendicular to the extending direction S of the through hole 34, the width of the projection 70 decreases toward the top surface 71 of the projection 70. Accordingly, the drag created when the gas flow passes through the through hole 34 can be further reduced.

In a cross section perpendicular to the extending direction S, each projection 70 satisfies W2<W3. Therefore, the angles between the top surface 71 and the side surfaces 72 at the rounded corners 73 are obtuse. Accordingly, the occurrence of pre-ignition with the rounded corners 73 serving as a source is less than when the angles between the top surface 71 and the side surfaces 72 are acute.

Since the corners at which the top surface 71 is connected to the side surfaces 72 are the rounded corners 73, the occurrence of overheating of the corners is less than when the corners at which the top surface 71 is connected to the side surfaces 72 are non-rounded corners (edges). Therefore, the occurrence of pre-ignition with the corners serving as a source can be reduced.

Focusing on two of the projections 70 that are adjacent to each other, a distance W1 between the top surfaces 71 of the two projections 70 is less than the width W3 of each of the projections 70. The projections 70 are arranged such that the adjacent projections 70 are in contact with each other on the inner surface 35. Since the gaps between the adjacent projections 70 can be reduced, the drag created when portions of the gas flow enter the spaces between the adjacent projections 70 can be reduced.

A fifth embodiment will now be described with reference to FIG. 5(a). FIG. 5(a) is a front view of the through hole 34 in a spark plug according to the fifth embodiment. Projections 80 extend in the extending direction of the through hole 34 (direction perpendicular to the plane of FIG. 5(a)). Therefore, the drag on the inner surface 35 of the through hole 34 can be reduced by the projections 80. The projections 80 continuously extend over the entire length of the through hole 34 in the extending direction S from the inner surface 32 to the outer surface 33 of the cap portion 30 (see FIG. 2).

The projections 80 have a triangular cross-sectional shape along a plane perpendicular to the extending direction S. Each projection 80 includes side surfaces 82 that extend downward from an apex 81 of the projection 80 toward the inner surface 35. The side surfaces 82 of each projection 80 are connected to the inner surface 35 at corners 83. The apex 81 and the corners 83 are straight lines that extend in the extending direction S of the through hole 34, and the side surfaces 82 are flat surfaces that extend in the extending direction S of the through hole 34. The width of each projection 80 decreases toward the apex 81 of the projection 80. Accordingly, the drag created when the gas flow passes through the through hole 34 can be further reduced.

A distance W5 between the apices 81 of two of the projections 80 that are adjacent to each other is less than a distance W3 between the corners 83 of each of the projections 80. Accordingly, the drag created when portions of the gas flow enter the spaces between the adjacent projections 80 can be reduced.

A distance W4 between the corners 83 of two of the projections 80 that are adjacent to each other is less than the distance W5. Accordingly, the drag created when portions of the gas flow enter the spaces between the adjacent projections 80 can be reduced.

Figure 5:
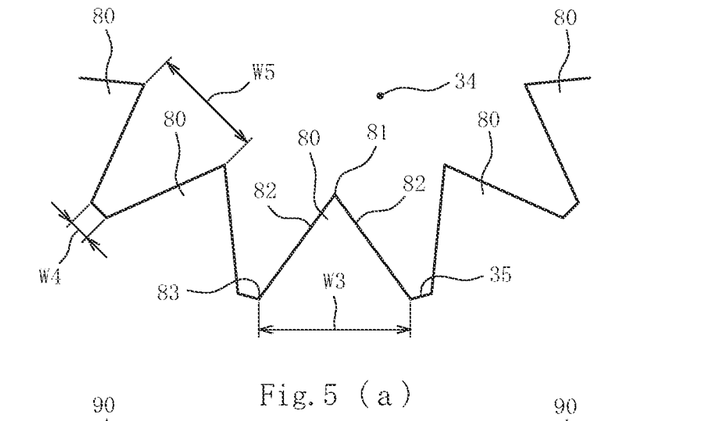

A sixth embodiment will now be described with reference to FIG. 5(*b*). FIG. 5(*b*) is a front view of the through hole 34 in a spark plug according to the sixth embodiment. Projections 90 extend in the extending direction of the through hole 34 (direction perpendicular to the plane of FIG. 5(*b*)). Therefore, the drag on the inner surface 35 of the through hole 34 can be reduced by the projections 90. The projections 90 continuously extend over the entire length of the through hole 34 in the extending direction S from the inner surface 32 to the outer surface 33 of the cap portion 30 (see FIG. 2).

The projections 90 have a triangular cross-sectional shape along a plane perpendicular to the extending direction S. Each projection 90 includes side surfaces 92 that extend downward from an apex 91 of the projection 90 toward the inner surface 35. The apex 91 is a straight line that extends in the extending direction S of the through hole 34, and the side surfaces 92 are flat surfaces that extend in the extending direction S of the through hole 34. The width of each projection 90 decreases toward the apex 91 of the projection 90. Accordingly, the drag created when the gas flow passes through the through hole 34 can be further reduced.

Focusing on two of the projections 90 that are adjacent to each other, a distance W5 between the apices 91 of the two projections 90 is less than the width W3 of the lower base of each of the projections 90. Accordingly, the drag created when portions of the gas flow enter the spaces between the adjacent projections 90 can be reduced.

The projections 90 are arranged such that the adjacent projections 90 are in contact with each other on the inner surface 35. Since the gaps between the adjacent projections 90 can be reduced, the drag created when portions of the gas flow enter the spaces between the adjacent projections 90 can be further reduced.

A seventh embodiment will now be described with reference to FIG. 5(*c*). FIG. 5(*c*) is a front view of the through hole 34 in a spark plug according to the seventh embodiment. Projections 100 extend in the extending direction of the through hole 34 (direction perpendicular to the plane of FIG. 5(*c*)). Therefore, the drag on the inner surface 35 of the through hole 34 can be reduced by the projections 100. The projections 100 continuously extend over the entire length of the through hole 34 in the extending direction S from the inner surface 32 to the outer surface 33 of the cap portion 30 (see FIG. 2).

Each projection 100 includes side surfaces 102 that extend downward from an apex 101 of the projection 100 toward the inner surface 35. The side surfaces 102 are flat surfaces that extend in the extending direction S of the through hole 34. The side surfaces 102 are connected to the inner surface 35 of the through hole 34 at corners 103. The apex 101 is a portion of a curved surface at which the side surfaces 102 meet. In a cross section perpendicular to the extending direction S, the width of each projection 100 decreases toward the apex 101 of the projection 100. Accordingly, the drag created when the gas flow passes through the through hole 34 can be further reduced.

Since the apex 101 of each projection 100 is a portion of a curved surface at which the side surfaces 102 meet, the occurrence of overheating of the apex 101 is less than when the apex 101 of the projection 100 is an edge between two surfaces. Therefore, the occurrence of pre-ignition with the apex 101 serving as a source can be reduced.

A distance W5 between the apices 101 of two of the projections 100 that are adjacent to each other is less than a distance W3 between the corners 103 of each of the projections 100. Accordingly, the drag created when portions of the gas flow enter the spaces between the adjacent projections 100 can be reduced.

A distance W4 between the corners 103 of two of the projections 100 that are adjacent to each other is less than the distance W5. Accordingly, the drag created when portions of the gas flow enter the spaces between the adjacent projections 100 can be reduced.

Figure 6:
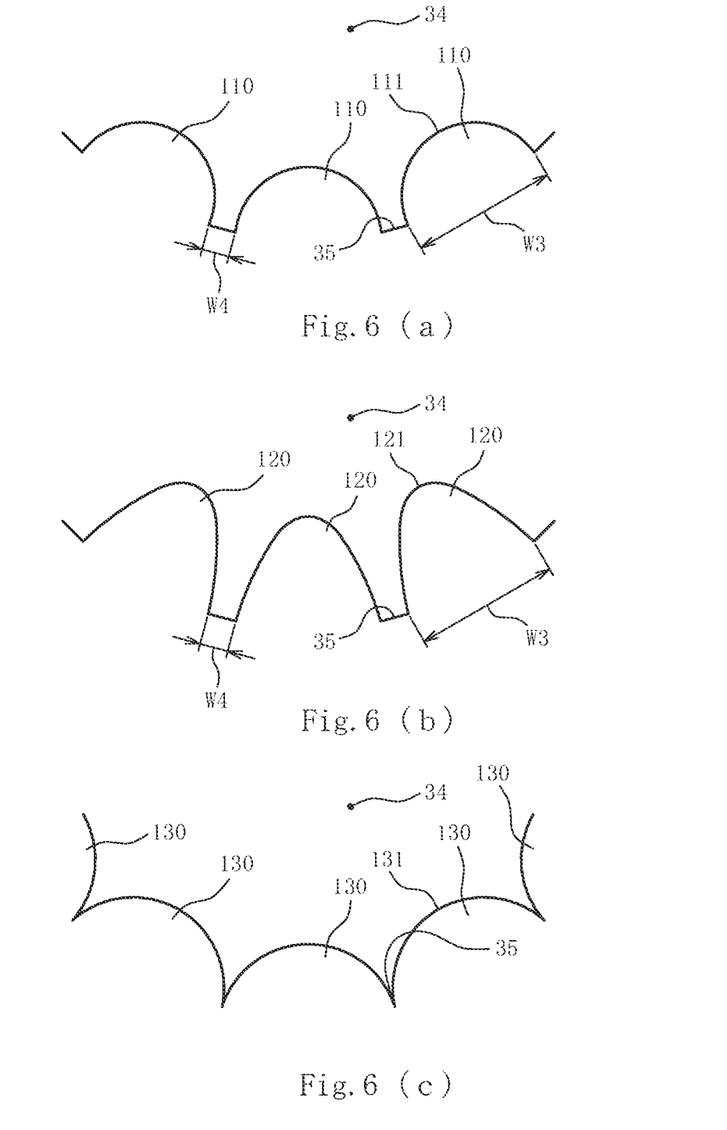

An eighth embodiment will now be described with reference to FIG. 6(*a*). FIG. 6(*a*) is a front view of the through hole 34 in a spark plug according to the eighth embodiment. Projections 110 extend in the extending direction of the through hole 34 (direction perpendicular to the plane of FIG. 6(*a*)). Therefore, the drag on the inner surface 35 of the through hole 34 can be reduced by the projections 110. The projections 110 continuously extend over the entire length of the through hole 34 in the extending direction S from the inner surface 32 to the outer surface 33 of the cap portion 30 (see FIG. 2).

The projections 110 have a semicircular cross-sectional shape along a plane perpendicular to the extending direction S. Each projection 110 has an apex 111 that is a portion of a curved surface (cylindrical surface). In a cross section perpendicular to the extending direction S, the width of each projection 110 decreases toward the apex 111 of the projection 110. Accordingly, the drag created when the gas flow passes through the through hole 34 can be further reduced.

Since the apex 111 of each projection 110 is a portion of a curved surface, the occurrence of overheating of the apex 111 is less than when the apex 111 of the projection 110 is an edge between two surfaces. Therefore, the occurrence of pre-ignition with the apex 111 serving as a source can be reduced.

A distance W4 between two of the projections 110 that are adjacent to each other along the inner surface 35 is less than a width W3 of each of the projections 110 on the inner surface 35. Accordingly, the drag created when portions of the gas flow enter the spaces between the adjacent projections 110 can be reduced.

A ninth embodiment will now be described with reference to FIG. 6(*b*). FIG. 6(*b*) is a front view of the through hole 34 in a spark plug according to the ninth embodiment. Projections 120 extend in the extending direction of the through hole 34 (direction perpendicular to the plane of FIG. 6(*b*)). Therefore, the drag on the inner surface 35 of the through hole 34 can be reduced by the projections 120. The projections 120 continuously extend over the entire length of the through hole 34 in the extending direction S from the inner surface 32 to the outer surface 33 of the cap portion 30 (see FIG. 2).

The projections 120 have a semielliptical cross-sectional shape along a plane perpendicular to the extending direction S. Each projection 120 has an apex 121 that is a portion of a curved surface. In a cross section perpendicular to the extending direction S, the width of each projection 120 decreases toward the apex 121 of the projection 120. Accordingly, the drag created when the gas flow passes through the through hole 34 can be further reduced.

Since the apex 121 of each projection 120 is a portion of a curved surface, the occurrence of overheating of the apex 121 is less than when the apex 121 of the projection 120 is an edge between two surfaces. Therefore, the occurrence of pre-ignition with the apex 121 serving as a source can be reduced.

A distance W4 between two of the projections 120 that are adjacent to each other along the inner surface 35 is less than a width W3 of each of the projections 120 on the inner surface 35. Accordingly, the drag created when portions of the gas flow enter the spaces between the adjacent projections 120 can be reduced.

A tenth embodiment will now be described with reference to FIG. 6(c). FIG. 6(c) is a front view of the through hole 34 in a spark plug according to the tenth embodiment. Projections 130 extend in the extending direction of the through hole 34 (direction perpendicular to the plane of FIG. 6(c)). Therefore, the drag on the inner surface 35 of the through hole 34 can be reduced by the projections 130. The projections 130 continuously extend over the entire length of the through hole 34 in the extending direction S from the inner surface 32 to the outer surface 33 of the cap portion 30 (see FIG. 2).

The projections 130 have a semicircular cross-sectional shape along a plane perpendicular to the extending direction S. Each projection 130 has an apex 131 that is a portion of a curved surface (cylindrical surface). In a cross section perpendicular to the extending direction S, the width of each projection 130 decreases toward the apex 131 of the projection 130. Accordingly, the drag created when the gas flow passes through the through hole 34 can be further reduced.

Since the apex 131 of each projection 130 is a portion of a curved surface, the occurrence of overheating of the apex 131 is less than when the apex 131 of the projection 130 is an edge between two surfaces. Therefore, the occurrence of pre-ignition with the apex 131 serving as a source can be reduced.

The projections 130 are arranged such that the adjacent projections 130 are in contact with each other on the inner surface 35. Since the gaps between the adjacent projections 130 can be reduced, the drag created when portions of the gas flow enter the spaces between the adjacent projections 130 can be further reduced.

Although the present invention has been described based on embodiments, the present invention is not limited to the above-described embodiments in any way, and it can be easily understood that various improvements and modifications are possible within the spirit of the present invention. For example, the shape of the cap portion 30 and the number, shapes, sizes, etc., of the through holes 34 may be set as appropriate.

Although the inner surface 35 of the through hole 34 has a circular cross-sectional shape in the above-described embodiments, the cross-sectional shape of the inner surface 35 is not necessarily limited to this. Examples of other cross-sectional shapes of the inner surface 35 include a polygonal shape, such as a quadrangular shape or a pentagonal shape, and an elliptical shape.

Although all of the projections provided on the inner surface 35 of the through hole 34 have the same shape and the same size in the above-described embodiments, the projections are not necessarily limited to this. The projections may, of course, have different sizes and shapes.

Although the projections continuously extend over the entire length of the through hole 34 in the extending direction S from the inner surface 32 to the outer surface 33 of the cap portion 30 in the above-described embodiments, the projections are not necessarily limited to this. The projections may, of course, have a length in the extending direction S of the through hole 34 that is less than the entire length of the through hole 34 in the extending direction S of the through hole 34. This is because as long as the projections that extend in the extending direction S are provided on the inner surface 35 of the through hole 34, the drag created when the gas flow passes through the through hole 34 is less than when no projections are provided.

Although the projections have a trapezoidal shape, a triangular shape, a semicircular shape, or a semielliptical shape on a cross section perpendicular to the extending direction S of the through hole 34 in the above-described embodiments, the projections are not necessarily limited to this. The projections may, of course, instead have other cross-sectional shapes. Examples of other cross-sectional shapes include a quadrangular shape other than a trapezoid shape, such as a square shape or a rectangular shape. The cross-sectional shape of the projections may, of course, also be a shape obtained by cutting a polygon, such as a pentagon or a hexagon, into halves.

Although the top surface 37, 51, 61, 71 of each projection 36, 50, 60, 70 is a flat surface in the above-described first to fourth embodiments, the top surface 37, 51, 61, 71 is not necessarily limited to this. The top surface 37, 51, 61, 71 may, of course, instead be a curved surface. The curved surface may be, for example, a concave surface shaped such that a central portion thereof in the width direction of the projection is recessed toward the inner surface 35, or a convex surface shaped such that a central portion thereof in the width direction of the projection bulges in a direction away from the inner surface 35. When the top surface 37, 51, 61, 71 of each projection 36, 50, 60, 70 is a convex surface, the central portion of the convex surface serves as the apex. In this case, the apex is a portion of a curved surface, so that the occurrence of pre-ignition with the apex serving as a source can be reduced.

When the top surface 37, 51, 61, 71 of each projection 36, 50, 60, 70 is a concave surface, corners (edges) at which the top surface (concave surface) is connected to the side surfaces 38, 52, 62, 72 serve as the apices of the projection. In this case, when the corners (apices) are rounded so that the apices are portions of curved surfaces, the occurrence of pre-ignition with the apices serving as a source can be reduced.

Although not described in the embodiments, the corners at which each projection 36, 50, 60, 70, 80, 90, 100, 110, 120, 130 is connected to the inner surface 35 of the through hole 34 may, of course, be rounded. When the corners are rounded, stress generated at the corners can be reduced. Therefore, the risk of breakage of the corners can be reduced.

Although the ground electrode 23 that extends through the front end portion 21 of the metal shell 20 is disposed at a position where the external thread 22 is provided in the above-described embodiments, the configuration is not necessarily limited to this. For example, the configuration may, of course, instead be such that the cap portion is disposed to expose the front end surface of the front end portion 21 of the metal shell 20 and that the ground electrode is connected to the front end surface of the front end portion 21. The ground electrode may be either straight or bent. The ground electrode may instead be joined to the cap portion.

Although the end portion 24 of the ground electrode 23 is disposed in front of the center electrode 13 so that the spark gap 25 is formed in front of the center electrode 13 in the above-described embodiments, the spark gap 25 is not necessarily limited to this. For example, the end portion 24 of the ground electrode 23 may, of course, be spaced from a side surface of the center electrode 13 so that the spark gap 25 is formed between the side surface of the center electrode 13 and the end portion 24 of the ground electrode 23. In addition, a plurality of ground electrodes 23 may, of course, be provided to form a plurality of spark gaps 25.

Although the cap portion 30 is welded to the metal shell 20 in the above-described embodiments, the configuration is not necessarily limited to this. A tubular member including a cap portion formed at the front end thereof may, of course, be prepared instead of the cap portion 30 and be connected to the metal shell 20 to form the pre-chamber 31. The tubular member is a member having a tubular shape with a closed front end, and an internal thread that engages with the external thread 22 of the metal shell 20 is formed on an inner peripheral surface of the tubular member. An external thread that engages with the threaded hole 2 in the engine 1 is formed on an outer peripheral surface of the tubular member. The internal thread of the tubular member is engaged with the external thread 22 of the metal shell 20 so that the cap portion is disposed in front of the metal shell 20. The projections are provided on the inner surface 35 of each of the through holes 34 formed in this cap portion.

Means for connecting the tubular member to the metal shell 20 to place the cap portion in front of the metal shell 20 is not limited to the engagement between the internal thread on the inner peripheral surface of the tubular member and the external thread 22 of the metal shell 20. The tubular member including the cap portion may, of course, instead be connected to the metal shell by other means. Examples of other means include welding between the tubular member and the metal shell. The tubular member may be made of, for example, a metal material, such as a nickel-based alloy or stainless steel, or a ceramic such as silicon nitride.

REFERENCE SIGNS LIST

10 spark plug
13 center electrode
20 metal shell
23 ground electrode
24 end portion of ground electrode
25 spark gap
30 cap portion
34 through hole
25 inner surface
36, 50, 60, 70, 80, 90, 100, 110, 120, 130 projection
37, 51, 61, 71 top surface (apex)
62, 72 side surface
63, 73 rounded corner
81, 91, 101, 111, 121, 131 apex
S extending direction

What is claimed is:

1. A spark plug comprising:
   a metal shell having a tubular shape and extending in a direction from front to back;
   a center electrode retained in the metal shell in an insulated manner;
   a ground electrode that is electrically connected to the metal shell and that defines a spark gap between the center electrode and an end portion of the ground electrode; and
   a cap portion that covers the center electrode and the end portion of the ground electrode from the front in a region in front of the metal shell and in which a through hole is formed,
   wherein the cap portion includes a plurality of projections on an inner surface of the through hole, and
   wherein the projections continuously extend over an entire length of the throe h hole in an extending direction in which the through hole extends.

2. The spark plug according to claim 1, wherein each projection has a width that decreases toward an apex of the projection in a cross section perpendicular to the extending direction.

3. The spark plug according to claim 1, wherein an apex of each projection is a flat surface.

4. The spark plug according to claim 3, wherein each projection includes a top surface that constitutes the apex and a side surface connected to the top surface, and
   wherein a corner at which the top surface is connected to the side surface is rounded.

5. The spark plug according to claim 1, wherein an apex of each projection is a portion of a curved surface.

6. The spark plug according to claim 1, wherein a distance between two of the projections that are adjacent to each other is less than a width of each of the two of the projections in a cross section perpendicular to the extending direction.

* * * * *